United States Patent [19]

Agren

[11] Patent Number: 5,716,496
[45] Date of Patent: Feb. 10, 1998

[54] METHOD AND APPARATUS FOR TREATMENT OF BLACK LIQUOR

[75] Inventor: Erik Agren, Esbo, Finland

[73] Assignee: Ahlstrom Machinery Oy, Helsinki, Finland

[21] Appl. No.: 500,012

[22] Filed: Jul. 10, 1995

[30] Foreign Application Priority Data

Jul. 11, 1994 [FI] Finland .................................. 943286

[51] Int. Cl.$^6$ ...................................................... B01D 1/22
[52] U.S. Cl. ...................... 159/49; 159/5; 159/13.1; 159/DIG. 22; 162/43; 162/30.1
[58] Field of Search ...................... 159/49, 5, 13.1, 159/13.2, 13.3, 47.1, DIG. 22; 162/43, 30.1, 30.11

[56] References Cited

U.S. PATENT DOCUMENTS

| | | | |
|---|---|---|---|
| 5,143,579 | 9/1992 | Field et al. | 162/30.1 |
| 5,382,321 | 1/1995 | Fägerlind eet al. | 159/47.3 |
| 5,472,568 | 12/1995 | Mullen et al. | 162/30.11 |

OTHER PUBLICATIONS

Puumassan valmistus II (Manufacture of Woodpulp II), 1983, p. 1181 (the passage underlined has been translated into English).

Swann, C.E., "American Papermaker", Oct. 1990, pp. 24–25.

Hedrick, R.H. et al, Tappi Journal, Dec., 1992, pp. 107–111.

Ahlstrom Evaporators brochure, (date unknown).

"Evaporators", A. Ahlstrom Osakeyhitio brochure.

Osborne, "A Falling–Film Crystallizing Concentrator ...", May 1992 Tappi Journal, pp. 107–111.

Hedrick et al, "Crystallizing Sodium Salts From Black Liquor", Dec. 1992 Tappi Journal, pp. 107–111.

Primary Examiner—Christopher Kim
Attorney, Agent, or Firm—Nixon & Vanderhye P.C.

[57] ABSTRACT

A method and an apparatus are provided for controlling crystallization (and thus preventing harmful fouling of heat transfer surfaces) during the treatment of black liquor. The black liquor is concentrated to a high dry solids content (at least about 70%, e.g. about 75–90%) in a falling film crystallizing apparatus (e.g. falling film evaporator). A part of the liquor flowing from the heat transfer surfaces and collected in a retention vessel (e.g. an interior volume of the evaporator) is recirculated to the heat exchange surfaces and a part of the liquor is discharged for further treatment (e.g. combustion in a recovery boiler). A part of the black liquor in the recirculation system is returned directly to the retention vessel in order to facilitate mixing and thus to bring about, in the retention vessel, crystallization of inorganic salts of the black liquor that is as complete as possible. Some of the discharged black liquor also may be returned, and a mixer and/or baffles disposed in the retention tank, to further enhance mixing.

20 Claims, 1 Drawing Sheet

METHOD AND APPARATUS FOR TREATMENT OF BLACK LIQUOR

BACKGROUND AND SUMMARY OF THE INVENTION

The present invention relates to a method and an apparatus for controlling crystallization and thus preventing harmful fouling of heat transfer surfaces in the treatment of black liquor. According to the invention, black liquor is concentrated at a high dry solids content in a falling film crystallizing apparatus.

Conventionally, the black liquor from cellulose pulp production has been combusted to facilitate the recovery of chemicals in a recovery boiler at a dry solids content of approx. 63–67%. However, current techniques allow concentration of black liquor to a much higher dry solids content (e.g. about 70–85%) which gives remarkable advantages in the combustion of black liquor. Because of the higher dry solids content of the black liquor, the fouling of the upper wall tubes, screen tubes and the superheater elements in the furnace of the recovery boiler is reduced. Further, sulfur emissions, from the recovery boiler decrease remarkably. Generally, the operation of the soda recovery boiler stabilizes and process fluctuation reduces.

A problem with concentrating black liquor to high dry solids contents (i.e. about 70% or more) is that the heat transfer surfaces tend to be fouled more easily than with low dry solids contents. The most common form of fouling is sodium salt scaling on the heat transfer surfaces. At a certain dry solids content of black liquor, which is 52–58% depending on the black liquor, the black liquor becomes saturated with sodium salts (primarily a binary salt of sodium sulfate and sodium carbonate, burkeite) which tend to crystallize out of the solution. If the crystallization process is not controlled the heat transfer surfaces are fouled by the growth of the crystals.

When concentrating black liquor to high dry solids contents various forced circulation or falling film apparatus (e.g. falling film evaporators) have been used as crystallizing concentrators. In the apparatus with forced circulation, the growth of crystals is prevented by the high flow velocity of the liquor circulated. Further, fouling may be reduced by suppressed boiling of the liquid, induced by hydrostatic pressure. The boiling is limited in order to minimize the rise in temperature because the solubility of sodium carbonate reduces when the temperature rises and thus it precipitates more easily. However, the circulation pump of the forced circulation apparatus requires much energy; compared to a forced circulation apparatus, a falling film concentrator is a more economical device (see Osborne, D. M., Tappi Journal, May 1992, pages 107–111, the disclosure of which is incorporated by reference herein). Also in falling film apparatus a controlled crystal growth may be accomplished by an appropriate liquid circulation rate and liquor volume of the crystallizer (i.e. the volume of liquor at the bottom of the evaporator, in the circulation pump and the circulation pipe and on the heat transfer surface; see Hedrick, R. H. et al., Tappi Journal, December 1992, page 107–111, the disclosure of which is incorporated by reference herein). It has been suggested that high supersaturization of the solution is reduced by increasing the circulation rate of the liquor on the heat transfer surfaces and by raising the level of the liquor in the lower portion of the apparatus and thus prolonging the retention time in the concentrator.

The present invention provides a new, economical and technically applicable method and apparatus for controlling the crystallization of black liquor in falling film crystallizing concentrators.

The present invention relates to a method of controlling crystallization during treatment of black liquor, and thus preventing harmful fouling of the heat transfer surfaces during treatment of black liquor. During treatment, black liquor is concentrated to a high dry solids content in a falling film concentrator and a part of the black liquor which has passed down the heat transfer surfaces and has been collected in a retention tank is circulated to the heat transfer surfaces, while another part is discharged for further treatment. A significant feature of the invention is that part of the black liquor in the circulation system is returned to the retention tank in order to enhance mixing therein and thus to effect the most complete crystallization of the inorganic salts contained in the black liquor possible.

The present invention also relates to a crystallizing concentrator apparatus for treatment of black liquor. The concentrator apparatus comprises heat transfer elements, disposed in a shell, black liquor being supplied to the upper end of these elements so that it runs down along the elements and forms a film on the outer surface of the elements; a circulation pipe system and a circulation pump for circulating black liquor to the upper portion of the heat transfer elements; connections for supplying the black liquor to be treated to the apparatus and for discharging the concentrated black liquor from the apparatus; and a retention tank for the concentrated black liquor. A significant feature of the apparatus is that there is a connection provided between the circulation pipe line and the retention tank for returning part of the black liquor back to the retention tank.

If the crystallization in the retention tank has been brought as far as possible employing efficient mixing, no salts [or at least no harmful amount of salts] crystallize onto the heat transfer surfaces from the black liquor recirculated from the tank to the heat transfer elements. As is known, fresh black liquor to be concentrated is introduced to the circulation pipe to the black liquor to be circulated. In order to initiate the crystallization of the organic salts contained in this fresh liquor water must be removed from the liquor so as to obtain an adequate saturization required by the crystallization process. However, there is not enough time for crystallization of salts to take place to a harmful extent on the heat transfer surfaces and thus they are kept clean. A high crystallization degree in the black liquor removed from the heat transfer surfaces is obtained in the retention tank by means of efficient mixing. The retention time has much less influence on the crystallizing process than mixing because of the very viscous nature of the black liquor being treated.

According to the method of the invention, the black liquor is passed into contact with the heat transfer surfaces that does not contain any harmful amount of crystals, which would start growing on the heat transfer surfaces and would adhere thereto. In this way fouling of heat transfer surfaces, which would impede efficient heat transfer, may be avoided.

As is known, in falling film apparatus black liquor is continuously re-circulated back to the top of the heat transfer surfaces. When operating at high dry solids contents (i.e. an initial dry solids content of more than about 70%) the circulation rate is highly dependent on the dry solids content as the viscosity of the so black liquor increases with the rise of the dry solids content. In a crystallizer, a dry solids content of approximately 90% may be reached. At high dry solids contents, black liquor is very viscous and difficult to treat. The circulation rate must be increased when the dry solids content and thus also the viscosity rises to too high a level. These properties are specific to each black liquor. The dry solids content may be determined either by the increase in the boiling point or by a density measurement. The problem in the transfer of black liquor caused by the high viscosity is avoided also by a high temperature and a high pressure in the crystallizer, it being known from U.S. Pat. No. 4,929,307 that high pressure and temperature treatment of black liquor reduces the viscosity thereof.

In the method of the present invention, the circulation system, such as the circulating pump, must be dimensioned to exceed the normal demand (i.e. for a system with no circulation to the retention tank). The circulation rate of black liquor to be circulated to the heat transfer surfaces is adjusted by known methods based upon the dry solids content, and excess black liquor in the circulating system is guided to the retention tank. Preferably the lower portion of a concentrator vessel serves as the retention tank, which is larger in size than the bottom portion of a normal evaporator vessel. Alternatively or in addition a separate retention tank may be employed.

The volume of black liquor to be circulated to the retention tank depends on the properties of each black liquor (there are differences in the black liquors from different mills depending on e.g. the raw material and the pulp production method). Further, in addition to the sodium salts mentioned above, black liquor may also contain other inorganic substances which foul the heat transfer surfaces. These kinds of substances are, for example, non-process chemicals, such as silicon, which are not necessary in the pulp production process but are introduced to the process for example in the raw material, accumulate there and form a "dead load". In order to accomplish optimal crystallization (i.e. proceeding as far as possible) in the retention tank it is necessary to determine for each black liquor the correct circulation rate to be introduced to the retention tank by analyzing and testing.

Crystal growth may be boosted by providing a mixer and baffles in the retention tank. Also a part of the black liquor discharged from the crystallizing concentrator and to be transferred to the recovery boiler may be returned to the retention tank. In this case the returned volume must be taken into account when dimensioning the discharge pump.

According to a first aspect of the present invention a method of treating black liquor to produce black liquor having a dry solids concentration of at least about 70% utilizing a falling film concentrator including heat transfer surfaces, a retention tank, and a re-circulating system for returning black liquor from the retention tank to a top portion of the filling film concentrator, is provided. The method comprises the steps of: (a) Introducing black liquor having inorganic salts into the top portion of the falling film concentrator to fall in a film down the heat transfer surfaces, and pass to the retention tank. (b) Recirculating a first portion of the black liquor from the retention tank to the top portion of the falling film concentrator through the re-circulating system. (c) Withdrawing a second portion of the black liquor from the retention tank to effect further treatment thereof. And, (d) returning a part of the first portion of black liquor in the recirculation system directly to the retention tank so as to enhance mixing within the retention tank so as to substantially complete crystallization of the inorganic salts of the black liquor in the retention tank so that fouling crystallization of salts on the heat transfer surfaces is minimized.

The method preferably comprises the further step (e) of returning a part of the second portion of the black liquor to the retention tank so as to enhance mixing within the retention tank so as to further facilitate substantially complete crystallization of the inorganic salts of the black liquor in the retention tank so that fouling crystallization of salts on the heat transfer surfaces is minimized. There may also be the further step of mechanically mixing the black liquor in the retention tank using a mechanical or fluidic mixer, and/or baffles, disposed in the tank. A single vessel may include the heat transfer surfaces therein and the retention tank, the retention tank provided in a lower volume of the vessel, in which case step (a) is practiced so that the black liquor falls directly from the heat transfer surfaces into the retention tank.

Step (c) may be practiced to pass the second portion of the black liquor to a flash tank to reduce the pressure thereof, and to withdraw black liquor from the bottom of the flash tank, in which case step (e) is practiced to return a part of the black liquor withdrawn from the flash tank to the retention tank. Step (c) may also be further practiced to withdraw the black liquor having a dry solids content of at least about 70% from the retention vessel, and to pass the black liquor to a recovery boiler for combustion therein. Steps (a) through (c) may be practiced to concentrate the black liquor to a dry solids content of between about 75–90%, and step (c) may be further practiced to pass the majority of the black liquor withdrawn from the bottom of the flash tank to a recovery boiler.

According to another aspect of the present invention a method of treating black liquor utilizing a concentrator including heat so transfer surfaces, and a retention tank, a single vessel including the heat transfer surfaces therein and the retention tank, comprising the following steps: (a) Introducing black liquor having inorganic salts (and, e.g. a consistency of about 70% or even higher) into the concentrator to pass over the heat transfer surfaces, and then into the retention tank; and, (b) withdrawing a first portion of the black liquor from the retention tank and returning at least a part of the withdrawn first portion of black liquor directly to the retention tank so as to enhance mixing within the retention tank so as to so as to substantially complete crystallization of the inorganic salts of the black liquor in the retention tank.

There may be the further step of withdrawing a second portion of black liquor from the retention tank and passing at least a majority thereof to a recovery boiler, and returning a part of the second portion to the retention tank to enhance mixing therein.

The invention also comprises a crystallizing concentrator, particularly for the treatment of black liquor. The concentrator comprises the following components: A vessel having a black liquor inlet at a top portion thereof, and a distribution header. Falling film heat transfer surfaces disposed in the vessel below the black liquor distribution header. A retention tank. A recirculation system for recirculating a first portion of black liquor from the retention tank to the distribution header. A withdrawal line for withdrawing a second portion of black liquor from the retention tank for further treatment. And, means for introducing a part of at least one of the first and second portions of black liquor directly into the retention tank for enhancing mixing of black liquor in the retention tank.

The means for introducing black liquor directly into the retention tank may comprise a line between the recirculation system and the retention tank. Various valves, orifices, nozzles (including for introducing the liquid into the tank), headers, or other fluid control or directing components, may also comprise part of the introducing means. The means for introducing black liquor may further include a return line from the withdrawal line to the retention tank and any appropriate or desirable valves, nozzles, orifices, headers, or other fluidic control or distribution devices. Also the concentrator may further comprise a mechanical or fluidic mixer and/or baffles disposed in the retention tank.

A flash tank may be connected to the withdrawal line and a discharge line from the flash tank, in which case the return line is connected from the discharge line to the retention tank. While the retention tank may comprise a separate structure, it preferably comprises a lower volume of the vessel.

It is the primary object of the present invention to provide to substantially prevent fouling crystallization of salts on heat transfer surfaces for black liquor evaporators or like concentrators. This and other objects of the invention will become clear from an inspection of the detailed description of the invention and from the appended claims.

DETAILED DESCRIPTION OF THE DRAWINGS

Figure 1:
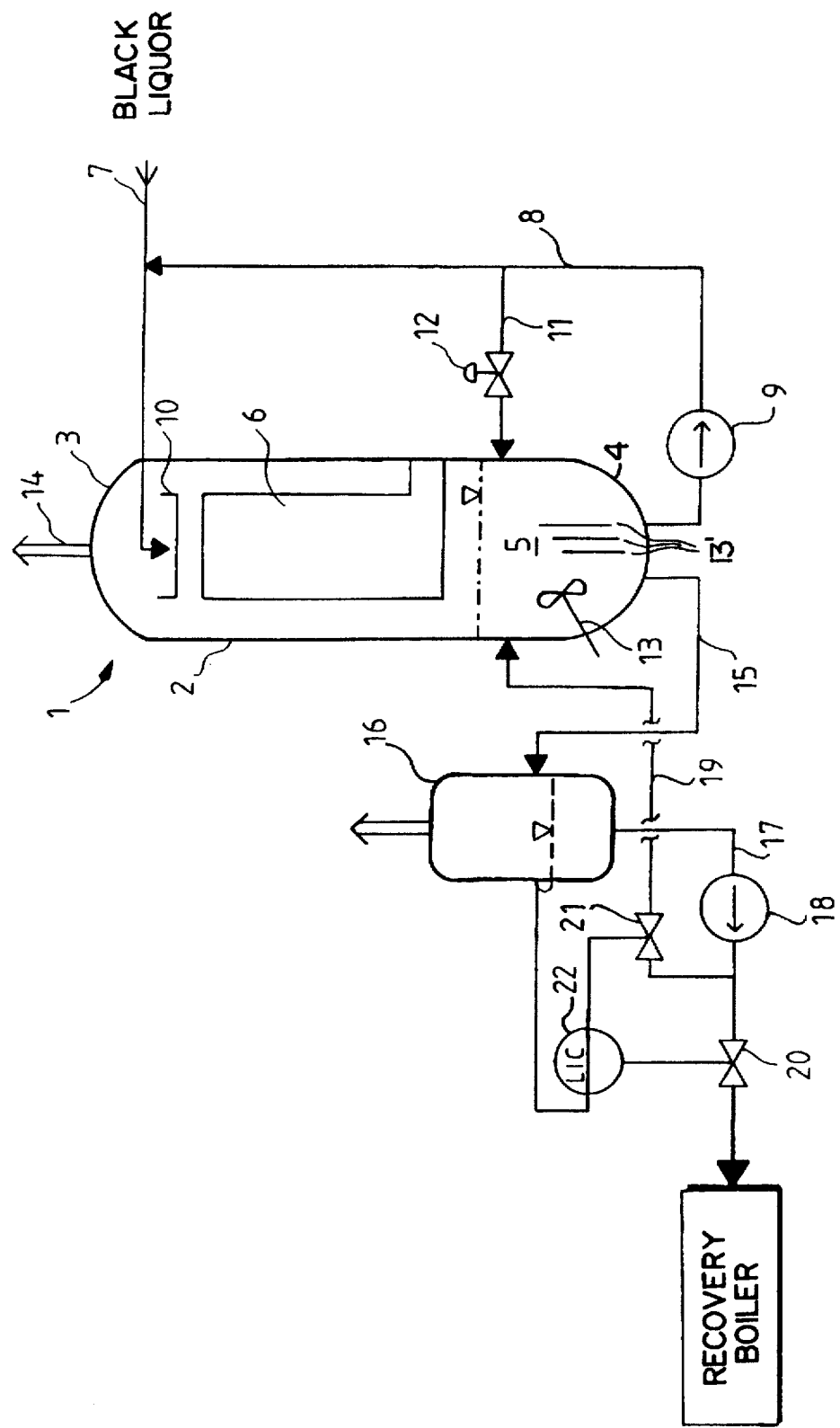
FIG. 1 is a schematic view of an exemplary concentrator according to the present invention for practicing a method of treating black liquor according to the present invention.

The crystallizing concentrator construction 1 in the exemplary system of FIG. 1 preferably comprises a shell formed of a vertical tubular wall 2 and of two convex ends 3 and 4. There are heat exchange elements provided in the shell 2-4, in this case conventional lamellas having heat transfer surfaces 6. If operating at very high dry solids contents (>about 70%, e.g. about 75–90%) the pressure must, because of the viscosity, be so high that elements suitable for this kind of circumstances are needed. For example tubular heat transfer elements hanging freely in the evaporator structure are this kind of means. A suitable heat transfer element construction has been disclosed, for example, in PCT patent application no. PCT/FI95/00059.

The black liquor to be concentrated is introduced in line 7 [e.g. from a digester, or heat treater (see U.S. Pat. No. 4,929,307), and/or other concentrators/evaporators, or the like] to the circulation system of the concentrator 1, the system comprising a re-circulation pipe 8 and a re-circulation pump 9. The black liquor is transported in line 8 to a distribution box (header) 10 disposed in the vicinity of the upper end 3 of the shell, which header 10 distributes the black liquor to be concentrated to flow down along the outer surface of the heat transfer elements 6. Heating steam is introduced inside the elements 6 to provide heat for effecting evaporation.

The lower interior volume 5 of the shell 2-4 serves as a retention tank collecting the liquor flowing downwardly from the heat transfer surfaces 6. A part of this liquor is introduced into the recirculation system 8, 9. The re-circulation system also comprises a connection line 11 disposed between the re-circulation pipe 8 and the volume/ retention tank 5. Via connection line 11, black liquor is introduced to the retention tank 5 to boost (enhance) mixing in order to take the process of crystallizing the inorganic salts of the black liquor, which has started on the heat transfer surfaces 6, as far as possible and thus to substantially prevent the crystals in the recirculated liquor (e.g. in line 8) from growing any further on the heat transfer surfaces 6.

While a retention tank 5 integral with the interior volume of concentrator/evaporator 1 is preferred, a distinct retention tank alternatively (or additionally) may be provided connected by a suitable conduit or conduits to the end 4 of the concentrator/evaporator 1 (which end 4 in that case may be just below heat transfer surfaces 6).

There is a valve 12 in the connection line 11 for controlling the liquor volume supplied to the retention tank 5. The valve 12 may be provided with a control system automatically [as by using sensors and a computer controller], or by operator intervention, responsive to the dry solids content of the black liquor in tank 5 (and/or in the recirculation system 8, 9), which could be measured—for example—from the rise in the boiling point of the liquor therein, as was described earlier. When the dry solids content has reached one or more predetermined levels, the circulation volume to the heat transfer surfaces 6 is increased or decreased as appropriate, e.g. by controlling the operation of pump 9 and/or the flow through valve 12.

There may also be a conventional mechanical (or fluidic) mixer 13 provided in the retention tank 5. Mixing in the tank 5 may be further enhanced by baffles (illustrated schematically at 13').

The evaporated vapor produced in the concentrator 1 is removed from the shell 2-4 via a line 14.

A part of the black liquor in the retention tank 5 is removed from the concentration system in a line 15 to a flash tank 16 in order to adjust the pressure suitable for introduction to a recovery boiler via a line 17. In the line 17, there is a discharge pump 18 dimensioned and constructed to also allow a part of the discharged liquor to be returned to the retention tank 5 via a line 19 to intensify the mixing if desired. There are valves 20 and 21 provided in the so lines 17 and 19 to cooperate with control 22 to control the liquid level in the flash tank 16.

At least the following immediate advantages are achieved by the present invention:

the interval between washing of the concentrating apparatus (e.g. falling film evaporator) 1 changes from a few hours to several days, so that no (or no separate) washing unit is required; and the fouling of the black liquor transport lines leading from the crystallizing concentrator 1 (e.g. the lines 8, 15) decreases, and thus the necessity for double pipelines and overdimensioning of the transfer pump are avoided.

While the invention has been described in connection with what is presently considered to be the most practical and preferred embodiment, it is to be understood that the invention is not to be limited to the disclosed embodiment, but on the contrary, is intended to cover various modifications and equivalent arrangements included is within the spirit and scope of the appended claims.

What is claimed is:

1. A method of treating black liquor to produce black liquor having a dry solids concentration of at least about 70% utilizing a falling film concentrator including heat transfer surfaces, a retention tank, and a re-circulating system for returning black liquor from the retention tank to a top portion of the filling film concentrator, comprising the steps of:

(a) introducing black liquor having inorganic salts into the top portion of the falling film concentrator to fall in a film down the heat transfer surfaces, and pass to the retention tank;

(b) recirculating a first portion of the black liquor from the retention tank to the top portion of the falling film concentrator through the re-circulating system;

(c) withdrawing a second portion of the black liquor from the retention tank to effect further treatment thereof; and (d) returning a part of the first portion of black liquor in the recirculation system directly to the retention tank so as to enhance mixing within the retention tank so as to substantially complete crystallization of the inorganic salts of the black liquor in the retention tank so that fouling crystallization of salts on the heat transfer surfaces is minimized.

2. A method as recited in claim 1 comprising the further step (e) of returning a part of the second portion of the black liquor to the retention tank so as to enhance mixing within the retention tank so as to further facilitate substantially complete crystallization of the inorganic salts of the black liquor in the retention tank so that fouling crystallization of salts on the heat transfer surfaces is minimized.

3. A method as recited in claim 2 comprising the further step of mechanically mixing the black liquor in the retention tank using a mechanical or fluidic mixer disposed in the retention tank.

4. A method as recited in claim 2 wherein step (c) is practiced to pass the second portion of the black liquor to a flash tank to reduce the pressure thereof, and to withdraw black liquor from the bottom of the flash tank; and wherein step (e) is practiced to return a part of the black liquor withdrawn from the bottom of the flash tank to the retention tank.

5. A method as recited in claim 4 wherein steps (a)–(c) are practiced to concentrate the black liquor to a dry solids content of between about 75–90%, and wherein step (c) is further practiced to pass the majority of the black liquor withdrawn from the bottom of the flash tank to a recovery boiler.

6. A method as recited in claim 1 comprising the further step of mechanically mixing the black liquor in the retention tank using a mechanical or fluidic mixer disposed in the retention tank.

7. A method as recited in claim 1 wherein a single vessel includes the heat transfer surfaces therein and the retention tank, the retention tank provided in a lower volume of the vessel; and wherein step (a) is practiced so that the black liquor falls directly from the heat transfer surfaces into the retention tank.

8. A method as recited in claim 1 comprising the further step of automatically controlling the rate of return of black liquor in the practice of step (d) in response to the sensing the dry solids concentration of the black liquor.

9. A method as recited in claim 1 wherein step (c) is further practiced to withdraw black liquor having dry solids content of at least about 70% from the retention vessel, and to pass the black liquor to a recovery boiler for combustion therein.

10. A method of treating black liquor utilizing a concentrator including heat transfer surfaces, and a retention tank, a single vessel including the heat transfer surfaces therein and the retention tank, the retention tank provided in a lower volume of the vessel, comprising the steps of:

(a) introducing black liquor having inorganic salts into the concentrator to pass over the heat transfer surfaces, and then into the retention tank; and (b) withdrawing a first portion of the black liquor from the retention tank and returning at least a part of the withdrawn first portion of black liquor directly to the retention tank so as to enhance mixing within the retention tank so as to so as to substantially complete crystallization of the inorganic salts of the black liquor in the retention tank.

11. A method as recited in claim 10 comprising the further step of withdrawing a second portion of black liquor from the retention tank, and passing at least a majority of the second portion to a recovery boiler.

12. A method as recited in claim 11 comprising the further step of returning a part of the second portion of black liquor to the retention tank to enhance mixing therein.

13. A method as recited in claim 12 comprising the further step of mixing the black liquor in the retention tank using a mechanical or fluidic mixer disposed within the retention tank.

14. A crystallizing concentrator for the treatment of black liquor, comprising:

a vessel having a black liquor inlet at a top portion thereof, and a distribution header;

falling film heat transfer surfaces disposed in said vessel below said black liquor distribution header;

a retention tank;

a recirculation system for re-circulating a first portion of black liquor from said retention tank to said distribution header;

a withdrawal line for withdrawing a second portion of black liquor from said retention tank for further treatment; and means for introducing a part of at least one of the first and second portions of black liquor directly into the retention tank for enhancing mixing of black liquor in the retention tank.

15. A concentrator as recited in claim 14 wherein said means for introducing black liquor directly into the retention tank comprises a line between said recirculation system and said retention tank.

16. A concentrator as recited in claim 15 wherein said means for introducing black liquor directly into the retention tank further comprises a return line from said withdrawal line to said retention tank.

17. A concentrator as recited in claim 16 further comprising a mechanical or fluidic mixer, and baffles, disposed in said retention tank.

18. A concentrator as recited in claim 16 further comprising a flash tank connected to said withdrawal line, and a discharge line from said flash tank; and wherein said return line is connected from said discharge line to said retention tank.

19. A concentrator as recited in claim 14 wherein said retention tank comprises a lower volume of said vessel.

20. A concentrator as recited in claim 14 further comprising baffles disposed in said retention tank to enhance mixing of black liquor in the retention tank.

* * * * *